United States Patent
Sueoka et al.

(10) Patent No.: US 9,149,898 B2
(45) Date of Patent: Oct. 6, 2015

(54) PISTON ASSEMBLING APPARATUS AND PISTON ASSEMBLING METHOD

(71) Applicant: HIRATA CORPORATION, Shinagawa-ku (JP)

(72) Inventors: Hisayuki Sueoka, Shinagawa-ku (JP); Shozo Maeda, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 254 days.

(21) Appl. No.: 13/916,625

(22) Filed: Jun. 13, 2013

(65) Prior Publication Data

US 2013/0269187 A1 Oct. 17, 2013

Related U.S. Application Data

(63) Continuation of application No. PCT/JP2010/007312, filed on Dec. 16, 2010.

(51) Int. Cl.
*F04B 53/14* (2006.01)
*B23P 19/04* (2006.01)

(52) U.S. Cl.
CPC ............... *B23P 19/043* (2013.01); *F04B 53/14* (2013.01); *Y10T 29/49256* (2015.01); *Y10T 29/5397* (2015.01)

(58) Field of Classification Search
CPC .......... B23P 19/04; B23P 19/043; B25J 9/00; B25J 9/0084; B25J 9/0093; F02F 7/00; F02F 7/0046; F04B 53/14; Y10T 29/49256; Y10T 29/5397
See application file for complete search history.

(56) References Cited

U.S. PATENT DOCUMENTS

| 3,952,393 A * | 4/1976 | van Ravenzwaay et al. ... 29/795 |
| 7,093,352 B2 | 8/2006 | Kim |
| 2003/0167628 A1 | 9/2003 | Tachibana et al. |

FOREIGN PATENT DOCUMENTS

| CN | 1521400 A | 8/2004 |
| CN | 201592344 U | 9/2010 |
| JP | 7-009271 A | 1/1995 |
| JP | 9-1433 A | 1/1997 |
| JP | 2003-266255 A | 9/2003 |
| JP | 4213096 B2 | 11/2008 |
| JP | 2009-113129 A | 5/2009 |

OTHER PUBLICATIONS

Office Action issued on Dec. 23, 2014, by the Chinese Patent Office in corresponding Chinese Patent Application No. 201080070673.4. (6 pages).

(Continued)

*Primary Examiner* — Richard Chang
(74) *Attorney, Agent, or Firm* — Buchanan Ingersoll & Rooney PC

(57) ABSTRACT

A piston assembling apparatus includes a piston holding means including a guide tube portion which contains the piston and guides the piston into the cylinder bore. A guide tube support portion supports the guide tube portion to be displaceable in a radial direction thereof. A moving means moves at least one of the piston holding means and the cylinder block so as to locate them at an insertion preparation position where the guide tube portion and the cylinder bore are coaxial with each other. A pressing means presses the piston contained in the guide tube portion toward the cylinder block to insert the piston into the cylinder bore in a state in which the piston holding means and the cylinder block are located at the insertion preparation position, and the guide tube portion is supported by the guide tube support portion to be displaceable in the radial direction thereof.

13 Claims, 14 Drawing Sheets

(56) References Cited

OTHER PUBLICATIONS

International Search Report (PCT/ISA/210) issued on Jan. 25, 2011, by the Japanese Patent Office as the International Searching Authority for International Application No. PCT/JP2010/007312.

Written Opinion (PCT/ISA/237) issued on Jan. 25, 2011, by the Japanese Patent Office as the International Searching Authority for International Application No. PCT/JP2010/007312.

Office Action issued on Jan. 24, 2014, by the Japanese Patent Office in corresponding Japanese Patent Application No. 2012-548547. (2 pages).

* cited by examiner

F I G. 4
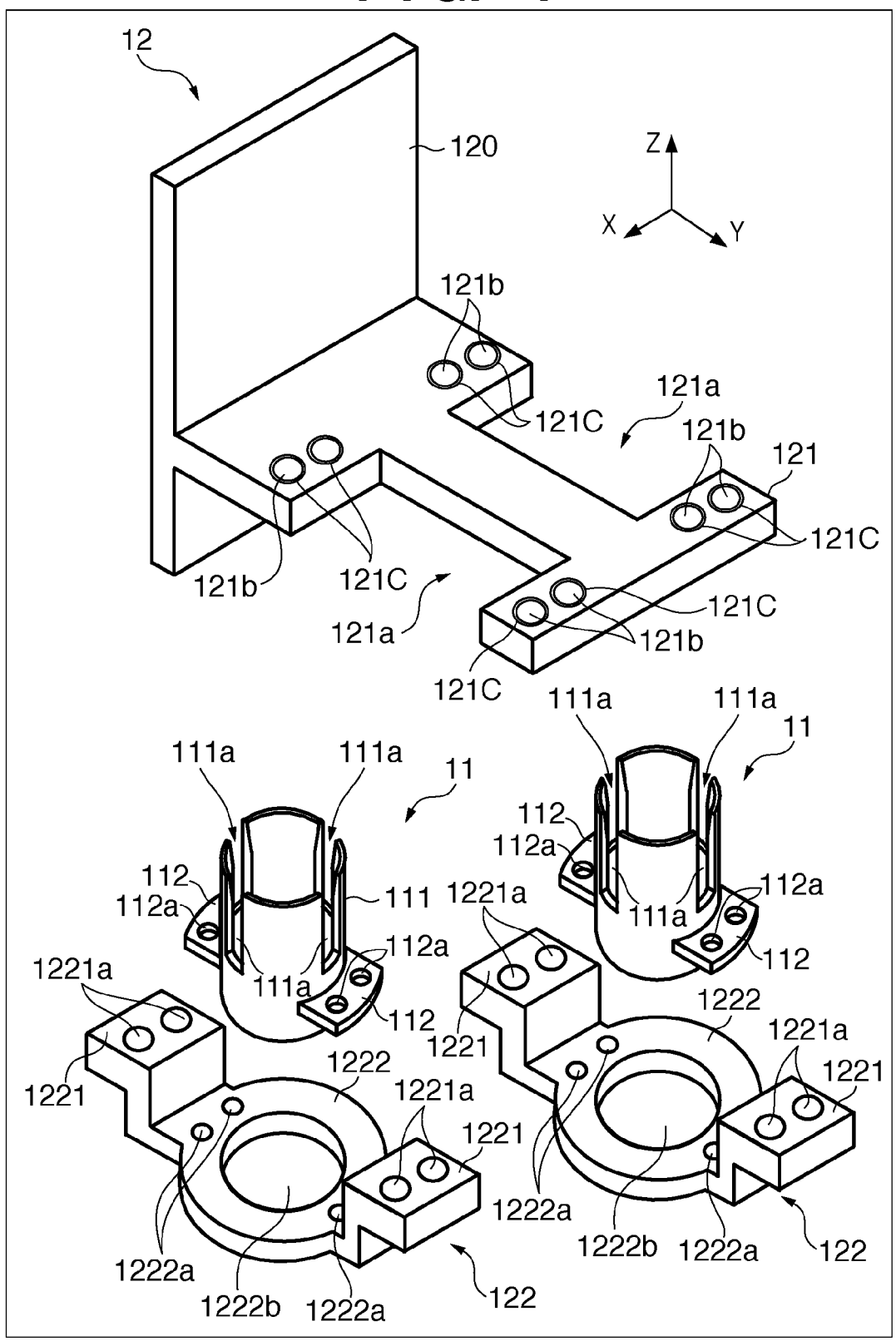

PISTON ASSEMBLING APPARATUS AND PISTON ASSEMBLING METHOD

This application is a continuation of International Application No. PCT/JP2010/007312 filed on Dec. 16, 2010, the entire content is incorporated herein by reference.

BACKGROUND OF THE INVENTION

1. Field of the Invention

The present invention relates to a apparatus and method for mounting a piston in a cylinder block of an engine.

2. Description of the Related Art

An insertion operation for inserting a piston into a cylinder bore formed in a cylinder block has to be executed in a state in which a diameter of a piston ring is reduced. Hence, a method for temporarily inserting the piston into a dedicated guide tube portion while the diameter of the piston ring is reduced, positioning the guide tube portion with the cylinder bore, and then pushing out the piston from the guide tube portion to insert it into the cylinder bore has been proposed (PLT 1).

When the positions of the guide tube portion and cylinder bore have a gap, the piston cannot be satisfactorily inserted into the cylinder bore. Hence, with the method described in PLT 1, the guide tube portion and cylinder bore are temporarily positioned by moving the guide tube portion or cylinder block. Then, using a chuck which contacts inner circumferential surfaces of the guide tube portion and cylinder bore, the guide tube portion and cylinder bore are coaxially positioned (centering). In this state, by pressing the guide tube portion against the upper surface of the cylinder block, the guide tube portion is fixed, and the piston is then inserted into the cylinder bore.

CITATION LIST

Patent Literature

PLT 1: Japanese Patent Laid-Open No. 2003-266255

SUMMARY OF THE INVENTION

Technical Problem

However, since the method described in PLT 1 require processes of three stages, that is, tentative positioning, centering, and fixing of the guide tube portion, a tact time is prolonged. Also, the device arrangement is complicated.

An object of the present invention is to execute an insertion operation of a piston for a shorter period of time by a simpler arrangement.

Solution to Problem

According to the present invention, there is provided a piston assembling apparatus for inserting a piston into a cylinder bore formed in a cylinder block, comprising: piston holding means comprising a guide tube portion which contains the piston and guides the piston into the cylinder bore, and a guide tube support portion which supports the guide tube portion to be displaceable in a radial direction thereof; moving means for moving at least one of the piston holding means and the cylinder block so as to locate the piston holding means and the cylinder block at an insertion preparation position which is set in advance as a position where the guide tube portion and the cylinder bore are coaxial with each other; and pressing means for pressing the piston contained in the guide tube portion toward the cylinder block to insert the piston into the cylinder bore in a state in which the piston holding means and the cylinder block are located at the insertion preparation position, and the guide tube portion is supported by the guide tube support portion to be displaceable in the radial direction thereof.

Also, according to the present invention, there is provided a piston assembling method for inserting a piston into a cylinder bore formed in a cylinder block, comprising: a containing step of containing the piston in a guide tube portion of piston holding means comprising the guide tube portion which contains the piston and guides the piston into the cylinder bore, and a guide tube support portion which supports the guide tube portion to be displaceable in a radial direction thereof; a moving step of moving at least one of the piston holding means and the cylinder block so as to locate the piston holding means and the cylinder block at an insertion preparation position which is set in advance as a position where the guide tube portion and the cylinder bore are coaxial with each other; and a pressing step of pressing the piston contained in the guide tube portion toward the cylinder block to insert the piston into the cylinder bore in a state in which the piston holding means and the cylinder block are located at the insertion preparation position, and the guide tube portion is supported by the guide tube support portion to be displaceable in the radial direction thereof.

Advantageous Effects of Invention

According to the present invention, a piston insertion operation can be performed by a simpler arrangement for a shorter period of time.

BRIEF DESCRIPTION OF THE DRAWINGS

FIG. 4 is a perspective view showing principal components of a piston holding unit 10;

DESCRIPTION OF THE EMBODIMENTS

Figure 1:
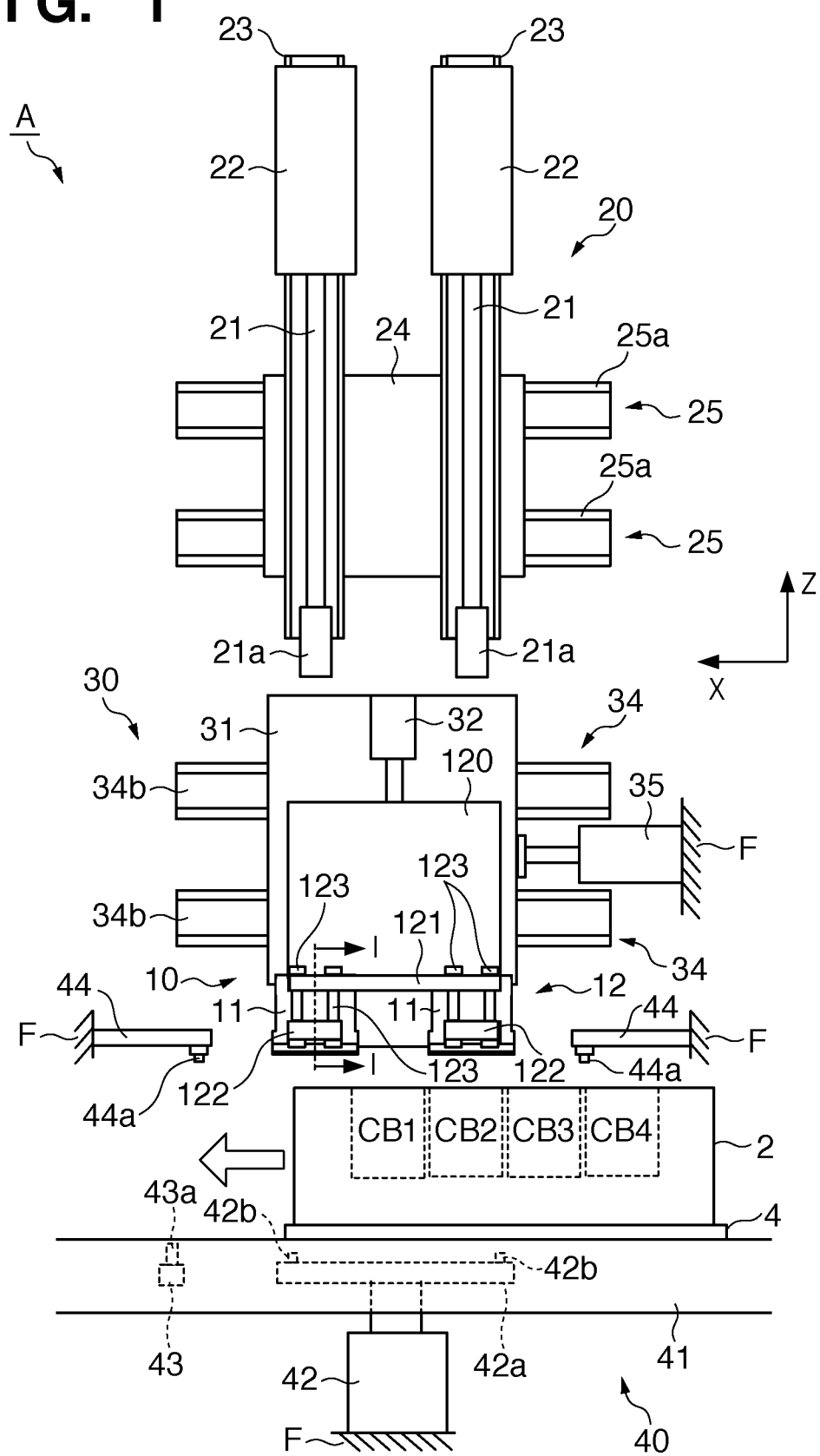
FIG. 1 is a schematic front view of a piston assembling apparatus A according to one embodiment of the present invention.
Figure 2:
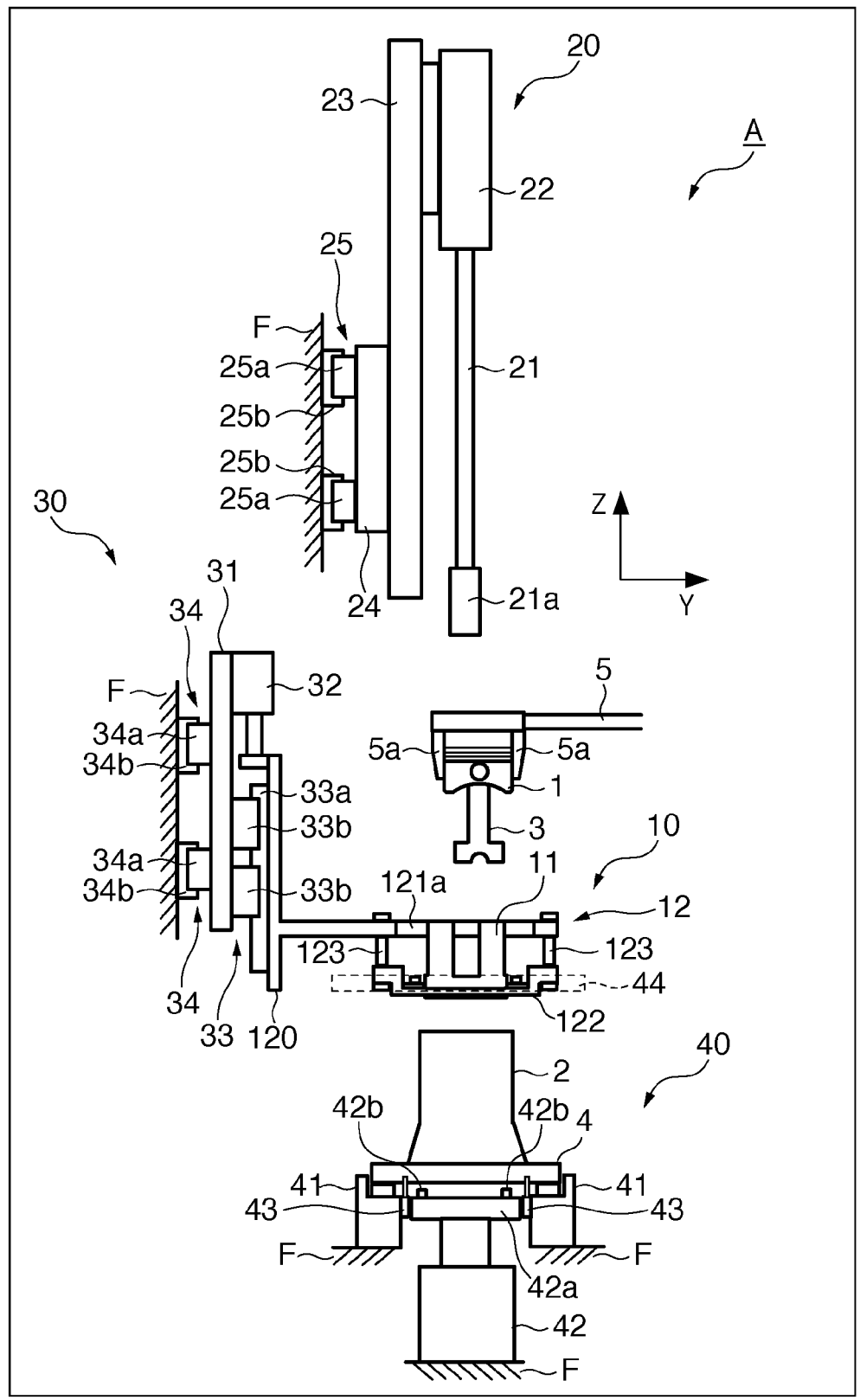
FIG. 2 is a schematic side view of the piston assembling apparatus A.

FIG. 1 is a schematic front view of a piston assembling apparatus A according to one embodiment of the present invention, and FIG. 2 is a schematic side view of the piston assembling apparatus A. In FIGS. 1 and 2, and other figures, Z indicates a vertical direction, and X and Y indicate horizontal directions which are orthogonal to each other. The piston assembling apparatus A is a device for inserting pistons 1 mounted with connecting rods 3 into cylinder bores CB1 to CB4 formed in a cylinder block 2. This embodiment assumes a case in which the cylinder block 2 is that of an in-line 4-cylinder engine, but it is applicable to other engines having different cylinder layouts and the numbers of cylinders.

The assembling apparatus A includes a frame F, which supports respective elements. In FIG. 1, the frame F is illustrated by a simple method. The piston assembling apparatus A includes a piston holding unit 10, a pressing unit 20, a moving device 30 for moving the piston holding unit 10, a moving device 40 for moving the cylinder block 2, and a robot 5 for conveying and mounting the pistons 1 to and in the piston holding unit 10.

Note that as will be described later, in case of this embodiment, both the piston holding unit 10 and cylinder block 2 are moved by the moving devices 30 and 40 to be located at insertion preparation positions, which are set in advance as positions where guide tube portions 11 of the piston holding unit 10 are coaxial with the cylinder bores CB1 to CB4. However, at least one of the piston holding unit 10 and cylinder block 2 need only be moved.

<Piston Holding Unit 10>

Figure 3:
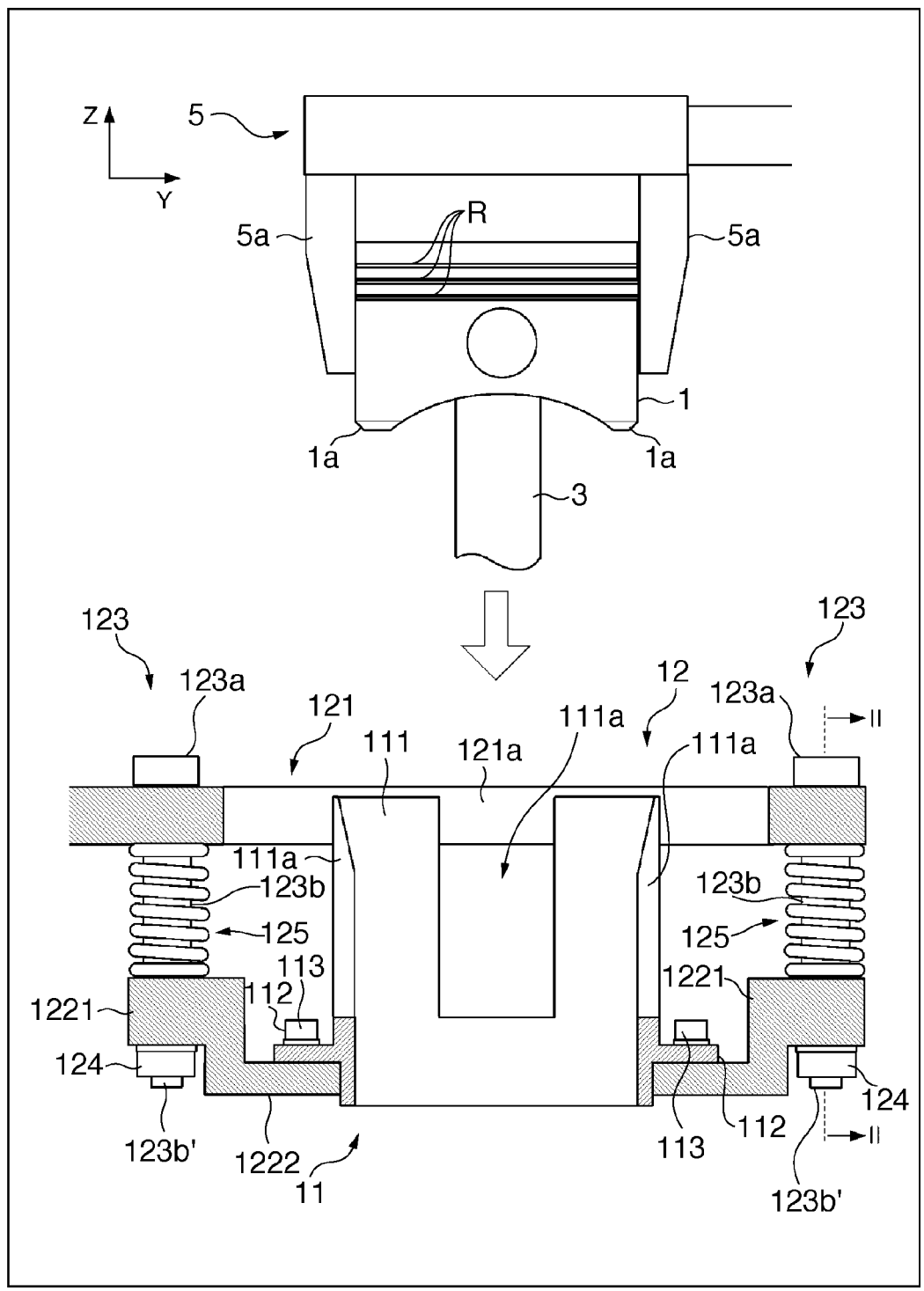
FIG. 3 is a partial sectional view of a guide tube support portion 12 taken along a line I-I in FIG. 1 and an explanatory view of a robot 5.
Figure 5:
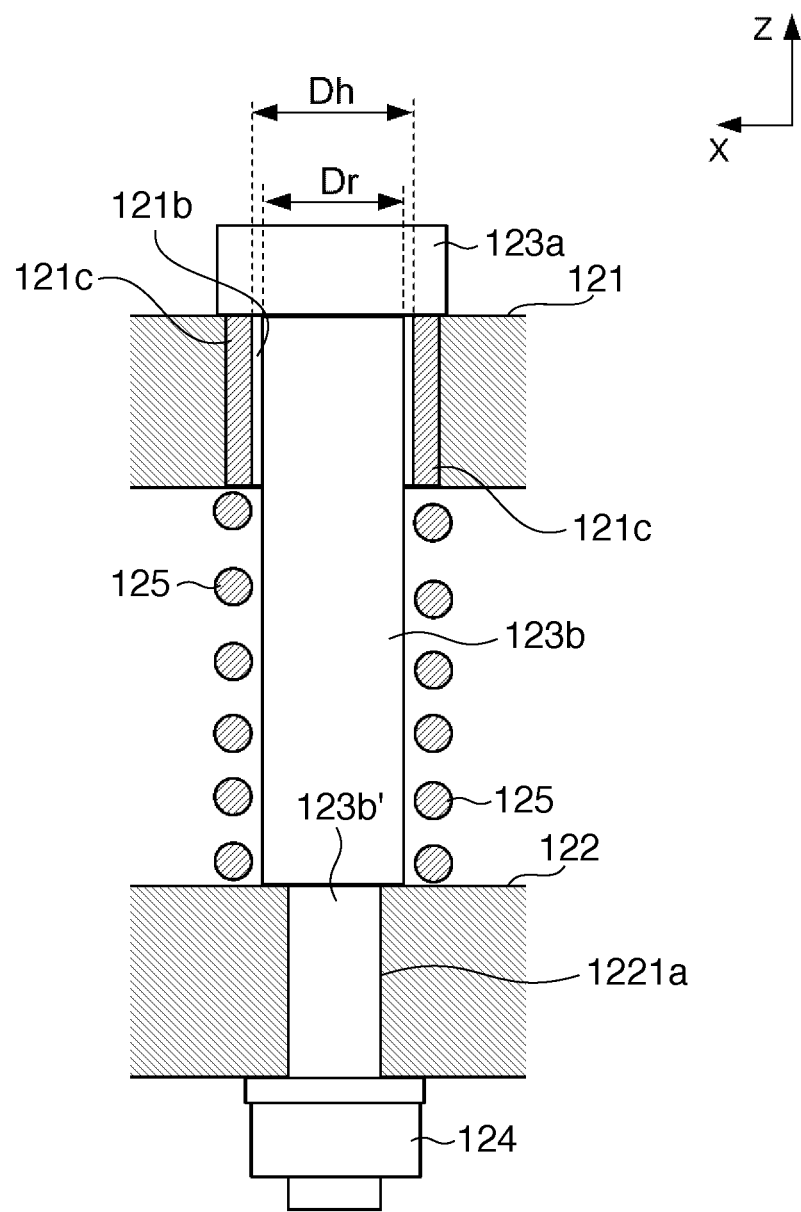
FIG. 5 is a partial sectional view of the vicinity of a rod member 123 taken along a line II-II in FIG. 3.

The piston holding unit 10 will be described below with reference to FIGS. 1 to 5. FIG. 3 is a partial sectional view of a guide tube support portion 12 taken along a line I-I in FIG. 1, and an explanatory view of the robot 5, FIG. 4 is a perspective view of principal components of the piston holding unit 10, and FIG. 5 is a partial sectional view of the vicinity of a rod member 123 taken along a line II-II in FIG. 3.

The piston holding unit 10 includes a guide tube portion 11 which contains the piston 1 and guides it into the cylinder bore, and a guide tube support portion 12 which supports the guide tube portion 11 to be displaceable in its radial direction. In this embodiment, the piston holding unit 10 includes a plurality of (two) guide tube portions 11, and can nearly simultaneously perform insertion operations of a plurality of (two) pistons 1. Especially, in this embodiment, two guide tube portions 11 are supported in correspondence with a separation distance between the cylinder bores CB1 and CB3 (that between CB2 and CB4).

Each guide tube portion 11 integrally includes a tube portion 111 and attachment portion 112. An inner diameter of a lower end portion of the tube portion 111 is set to have nearly the same value as an outer diameter of the piston 1 (except for the piston ring R) (the inner diameter of the lower end portion>the outer diameter of the piston 1), and notches 111a are intermittently formed in the circumferential direction. As shown in FIG. 3, the piston 1 is contained in the tube portion 111 in a state in which the diameter of the piston ring R is reduced by pawls 5a of the robot 5. The notches 111a are formed to avoid the pawls 5a and tube portion 111 from interfering with each other. An inner circumferential surface of an upper portion of the tube portion 111 is tapered, so that its diameter is gradually increased upward. This tapered portion allows the robot 5 to smoothly contain the piston 1 into the tube portion 111. The tapered surface of the inner circumferential surface of the upper portion of the tube portion 111 may have a conical shape, a diameter of which is increased linearly, or a convex surface shape, a curvature of which changes continuously. In the attachment portion 112, attachment holes 112a (see FIG. 4) are formed.

As shown in FIG. 4, the guide tube support portion 12 includes a support plate 120 which extends in the vertical direction, an upper portion member 121 which is formed integrally with the support plate 120 and extends horizontally from the support plate 120, and lower portion members 122 for respective guide tube portions 11. The upper portion member 121 is formed with two notches 121a, each of which forms a layout space of the guide tube portion 11, in its middle portion, and forms a nearly H shape in a planar view.

Each lower portion member 122 has attachment portions 1221, and a support portion 1222 between these portions. The support portion 1222 is a portion where the guide tube portion 11 is fixed. The support portion 1222 includes an opening 1222b in which the lower portion of the tube portion 111 is inserted, and threaded holes 1222a. The guide tube portion 11 is fixed to the lower portion member 1222 when bolts 113 are fastened to the threaded holes 1222a via the attachment holes 112a, as shown in FIG. 3. By detaching the bolts 113, the guide tube portion 11 can be detached from the lower portion member 122.

Each guide tube portion 11 may be integrally formed with the lower portion member 122. However, in this embodiment, since the guide tube portion 11 is detachably fixed to the guide tube support portion 12, as described above, it can be exchanged. For this reason, a case in which the guide tube portion 11 which has been worn by repetitive operations is required to be updated or a case in which an insertion operation of the piston 1 having different specifications is to be made can be coped with by exchanging only the guide tube portion 11.

Referring to FIGS. 3 and 5, each lower portion member 122 is suspended from the upper portion member 121 via rod members 123. Four rod members 123 are used per one lower portion member 122. Each rod member 123 has a head portion 123a, a shaft portion 123b having a diameter Dr, and a threaded portion 123b' which is formed on a lower end portion of the shaft portion 123b and has a diameter smaller than the diameter Dr. The lower portion member 122 includes attachment holes 1221a, through which the threaded portions 123b' are inserted, in its support portion 1222, and is fixed to the rod members 123 by fastening nuts 124 to the threaded portions 124b'.

The upper portion member 121 has hole portions 121b through which the shaft portions 123b are inserted. In case of this embodiment, each hole portion 121b is formed of a tube member (for example, a bush) 121c which is different from a member that forms the upper portion member 122, and the tube member 121c is fixed to the upper portion member 121. Each hole portion 121b may be directly formed in the member which forms the upper portion member 121, but it is preferably smooth and has a high wear resistance since the shaft portion 123b moves vertically. For this reason, this embodiment uses the tube member 121c (for example, a metal member) of a different member, which is excellent in such nature.

An inner diameter of each hole portion 121b is Dh, and has a relation Dh>Dr with respect to the outer diameter Dr of the shaft portion 123b. For this reason, the shaft portions 123b and the upper portion member 121 are not fixed to each other, and the shaft portions 123b are vertically movable in the hole portions 121b. For this reason, the lower portion member 122 is relatively displaceable in a Z direction with respect to the upper portion member 121. Elastic members 125, which bias the upper portion member 121 and lower portion member 122 in a direction in which they are separated from each other, are arranged between the upper portion member 121 and lower portion member 122. In case of this embodiment, each elastic member 125 is a coil spring, and the shaft portion 123b is inserted through the elastic member 125.

Furthermore, since the inner diameter Dh of each hole portion 121b and the outer diameter Dr of the shaft portion 123b have the relation Dh>Dr, the lower portion member 122 is horizontally displaceable with respect to the upper portion member 121 within a range of a difference: Dh−Dr. Therefore, the guide tube portion 11 fixed to the lower portion member 122 is supported by the guide tube support portion 12 to be displaceable in its radial direction (an arbitrary direction in the horizontal direction). Since the guide tube portion 11 is displaceable in its radial direction, when the piston 1 is inserted into the cylinder bore, and the piston 1 and the cylinder bore are decentered from each other, the guide tube portion 11 can displace together with the piston 1, thus attaining automatic alignment (centering), as will be described later.

Note that in this embodiment, the upper portion member 121 and rod members 123 are not fixed to each other so as to allow the guide tube portion 11 to be displaceable in its radial direction. Alternatively, the lower portion member 122 and rod members 123 may not be fixed to each other. Furthermore, both the upper portion member 121 and lower portion member 122 may not be fixed to the rod members 123. When the lower portion member 122 and rod members 123 are not fixed to each other, it is preferable to form a hole portion having a diameter larger than each shaft portion 123b of the rod member 123 using the same tube member as the tube member 121c as in the upper portion member 121.

Each tube member 121c may be an elastic member such as rubber. In this case, even when the inner diameter Dh of each hole portion 121b and the outer diameter Dr of the shaft portion 123b have a relation Dh=Dr, the upper portion member 121 and lower portion member 122 can be relatively displaceable in the horizontal direction due to elastic deformation of the elastic member. Therefore, the guide tube portion 11 is displaceable in its radial direction.

Furthermore, this embodiment adopts a structure using the rod members 123 as a structure in which the guide tube portion 11 is displaceable in its radial direction. However, the present invention is not limited to such specific structure. For example, another structure such as a structure in which the upper portion member 121 and lower portion member 122 are coupled using elastic members such as rubber may be adopted.

<Pressing Unit 20>

Referring to FIGS. 1 and 2, the pressing unit 20 includes two sets of pressing rods 21 which extend in the Z direction, sliders 22 which support the pressing rods 21, and guide members 23 which engage with the sliders 22 to guide movements of the sliders 22 in the Z direction, and extend in the Z direction, in correspondence with the number of (two) guide tube portions 11. A pressing portion 21a, which contacts an upper surface of the piston 1 to be inserted into the cylinder bore and presses the piston 1, is formed on the lower end portion of each pressing rod 21.

A pressing surface of each pressing portion 21a has a circular shape, and its diameter is sufficiently smaller than an inner diameter of a lower end portion of the tube portion 111 and the outer diameter of the piston 1. This is to continue to press the pistons 1 even when the pistons 1 and guide tube portions 11 are displaced in the horizontal direction upon inserting the pistons 1 into the respective cylinder bores CB1 to CB4, as will be described later.

The pressing unit 20 includes a driving device (not shown) used to move the sliders 22 in the Z direction. With this driving device, each slider 22 and pressing rod 21 integrally move between an upper escaped position and a lower insertion position (a position where the piston 1 is inserted into the cylinder bore). As this driving device, for example, a rack-pinion mechanism having a motor as a driving source can be adopted.

The two guide members 23 are fixed to a support plate 24. The support plate 24 is movable in an X direction by slide mechanisms 25. Thus, the position of each pressing rod 21 in the X direction can be changed. Each slide mechanism 25 includes a slider 25a arranged on a back surface (a left side surface in FIG. 2) of the support plate 24, and a guide member 25b which is supported by the frame F and extends in the X direction. The slider 25a engages with the guide member 25b to guide its movement in the X direction.

The pressing unit 20 includes a driving device (not shown) used to move the support plate 24 in the X direction. With this driving device, the support plate 24 moves between a first position where the two pressing rods 21 are located above the cylinder bores CB1 and CB2 (a position for the cylinder bores CB1 and CB3) and a second position where the two pressing rods 21 are located above the cylinder bores CB2 and CB4 (a position for the cylinder bores CB2 and CB4). As this driving device, for example, a ball screw mechanism having a motor as a driving source can be adopted. When the ball screw mechanism is adopted, a nut is arranged on the back surface side (or upper surface) of the support plate 24, and is threadably engaged with a ball screw.

<Moving Device 30>

Referring to FIGS. 1 and 2, the moving device 30 includes a support plate 31. A slide mechanism 33 is arranged between the support plate 31 and the support plate 120 of the piston holding unit 10 to allow the piston holding unit 10 to be movable in the Z direction. The slide mechanism 33 includes a guide member 33a which is arranged on a back surface of the support plate 120 and extends in the Z direction, and sliders 33b which are arranged on a front surface of the support plate 31. The sliders 33b engage with the guide member 33a. In this case, the sliders 33b are fixed, and the guide member 33a is slidably moved with respect to the sliders 33b.

On the support plate 31, a driving unit 32 used to lift the piston holding unit 10 in the Z direction is arranged. The driving unit 32 includes, for example, an air cylinder as its driving mechanism. A cylinder piston of the driving unit 32 is connected to the support plate 120, and is expanded and contracted in the Z direction to move the support plate 120 between the upper escaped position and the lower insertion preparation position. FIGS. 1 and 2 illustrate a state in which the piston holding unit 10 is located at the insertion preparation position.

Slide mechanisms 34 are arranged between the support plate 31 and frame F to allow the support plate 31 to be movable in the X direction. As a result, the piston holding unit 10 is also movable in the X direction. Each slide mechanism 34 includes a slider 34a arranged on the back surface of the support plate 31, and a guide member 34a which is supported by the frame F and extends in the X direction, and the slider 34a engages with the guide member 34b to be movably guided in the X direction.

The moving device 30 includes a driving unit 35, which is supported by the frame F, and moves the support plate 31 in the X direction. The driving unit 35 includes, for example, an air cylinder as its driving mechanism. As a result of movement of the support plate 31 by the driving unit 35, the piston holding unit 10 moves in the X direction. The driving unit 35 moves the piston holding unit 10 between a position where the two guide tube portions 11 are located above the cylinder bores CB1 and CB3 and that where the two guide tube portions are located above the cylinder bores CB2 and CB4.

<Moving Device 40>

Referring to FIGS. 1 and 2, the moving device 40 includes a pair of roller conveyors 41 which extend in the X direction, and are spaced apart in a Y direction. The cylinder block 2 mounted on a pallet 4 is conveyed by the pair of roller conveyors 41 in the X direction while facing up the upper surface on which a cylinder head (not shown) is attached.

Between the pair of roller conveyors 41, a stop unit 43, which includes a movable portion 43a to be advanced/retracted vertically, and stops the cylinder block 2 at a position below the insertion preparation position, is arranged. The stop unit 43 includes, for example, an air driving type stopper as a driving mechanism. When the movable portion 43a is located at an advanced position, it contacts the pallet 4 to stop movement of the pallet 4. When the movable portion 43a is located at a retracted position, since it does not contact the pallet 4, movement of the pallet 4 is continued.

The moving device 40 includes a lifting device 42 laid out between the pair of roller conveyors 41. The lifting device 42 is a device used to lift a lifting table 42a, and includes, for example, an air cylinder as its driving mechanism. The lifting device 42 moves the cylinder block 2 which is placed on the lifting table 42a upward to the insertion preparation position, and maintains that state until completion of the insertion operations of the pistons 1.

Positioning pins 42b are arranged on an upper surface of the lifting table 42a, and are fitted into holes (not shown) formed in a lower surface of the pallet 4, thus positioning the lifting table 42a and pallet 4 (and cylinder block 2).

Positioning members 44 are supported by the frame F in the vicinity of an insertion operation area of the pistons 1, and include positioning pins 44a. When the lifting device 42 moves the cylinder block 2 upward, the positioning pins 44a are fitted into holes (not shown) formed in an upper surface of the cylinder block 2, thus positioning the cylinder block 2 to the insertion preparation position.

By finally positioning the cylinder block 2 to the insertion preparation position by the positioning pins 44a, a positioning operation between the lifting table 42a and pallet 4 (and cylinder block 2) by the positioning pins 42b and a stop operation of the pallet (and cylinder block 2) by the stop unit 43 suffice to have relatively low precision.

<Operation Example>

An operation example of the piston assembling apparatus A will be described below. The piston assembling apparatus A automatically performs insertion operations of the pistons 1 into the cylinder bores CB1 to CB4 under the control of a control device (not shown). A moving operation of the cylinder block 2 to the insertion preparation position will be described first with reference to FIG. 6.

Figure 6:
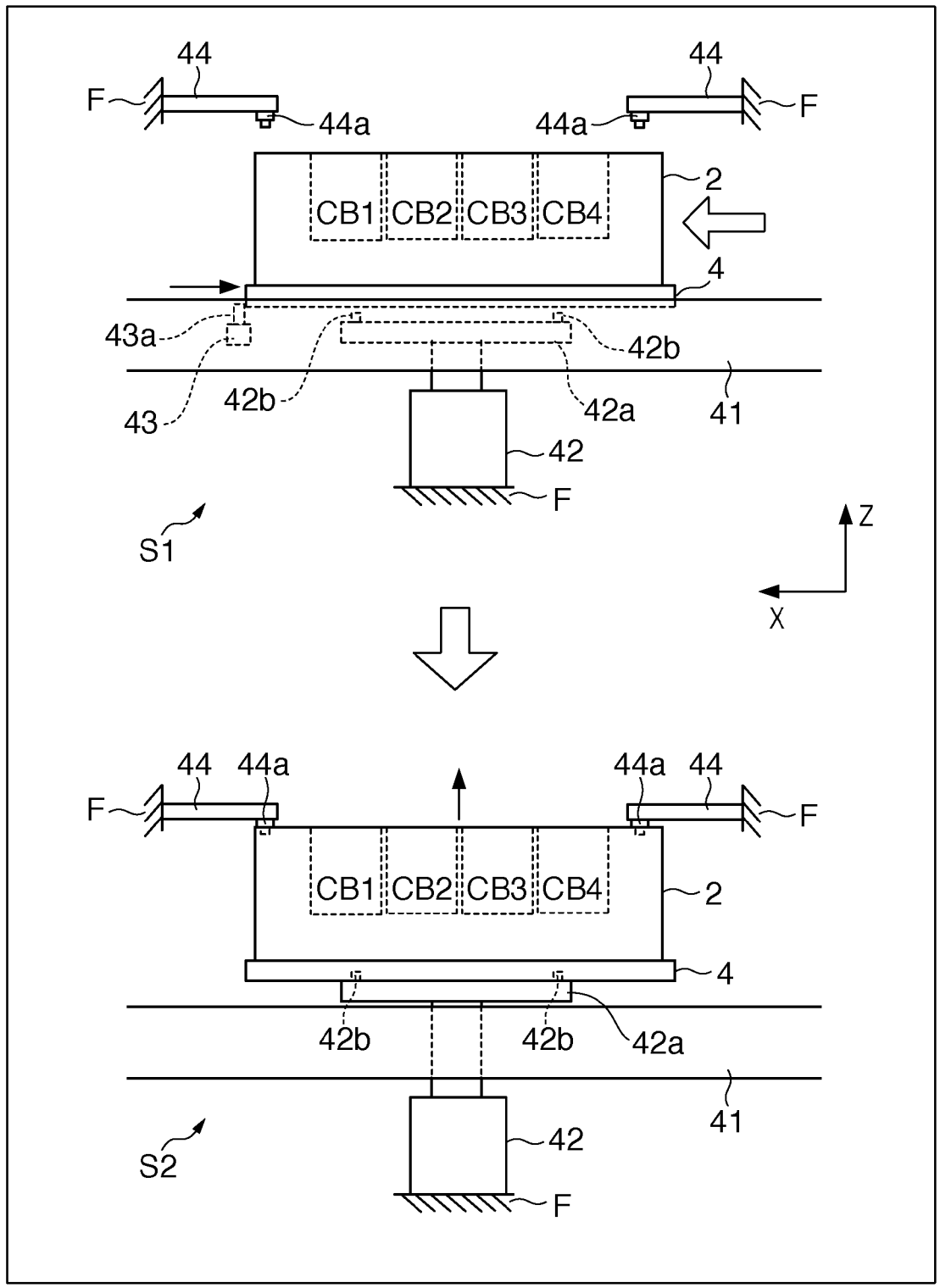
FIG. 6 is an operation explanatory view of the piston assembling apparatus A.

A state S1 in FIG. 6 shows a state in which the stop unit 43 stops the cylinder block 2 conveyed by the roller conveyors 41. At this time, the roller conveyors 41 are set in an idle rotation state. Subsequently, as shown in a state S2, the lifting device 42 is activated to position the pallet 4 by the positioning pins 42b of the lifting table 42a. After that, the lifting table 42a is further moved upward to separate the pallet 4 from the roller conveyors 41. Then, the lifting table 42a is moved upward to move upward the cylinder block 2 for each pallet 4, and the cylinder block 2 is positioned by the positioning pins 44a. Thus, the cylinder block 2 is located at the insertion preparation position.

Figure 7:
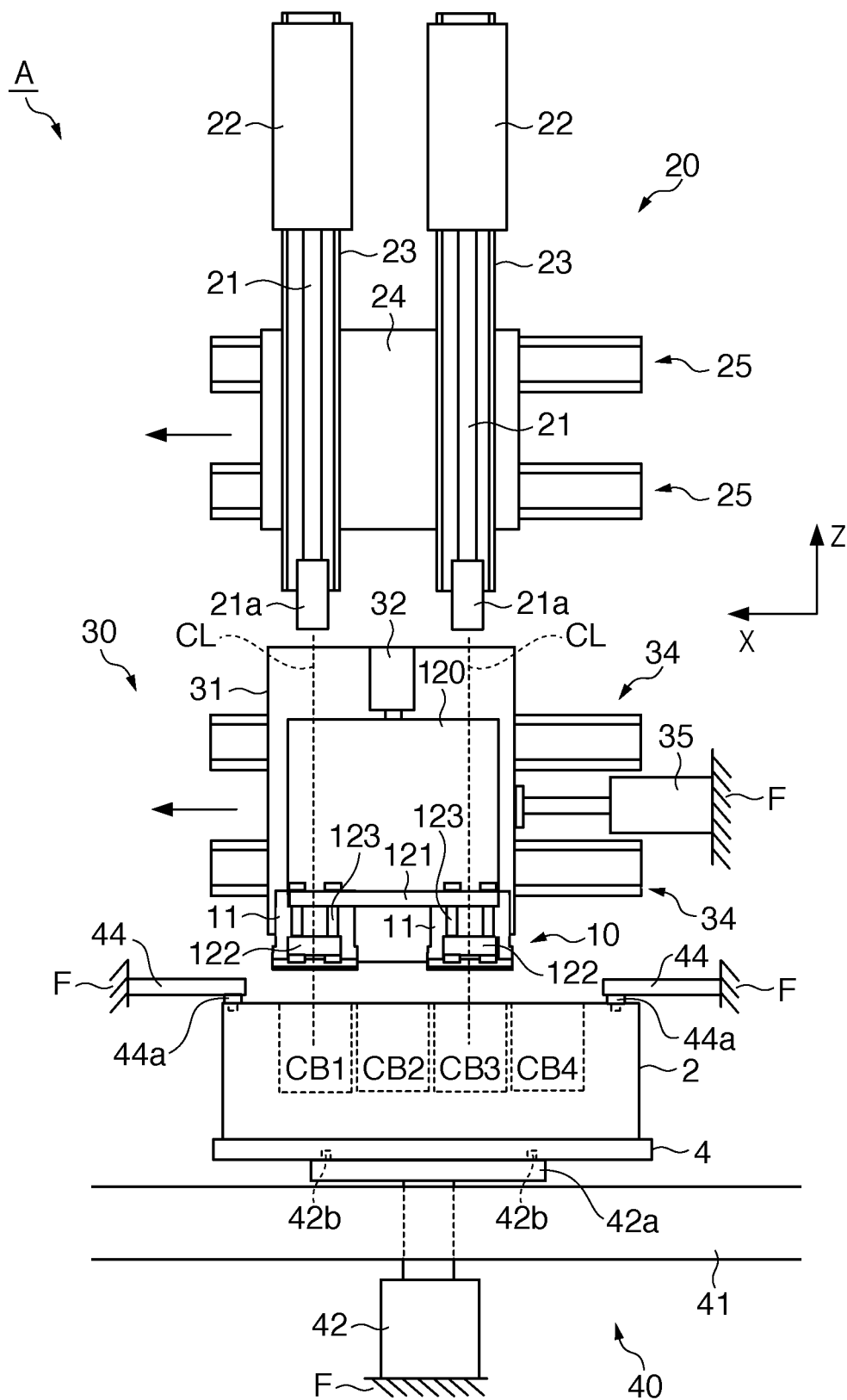
FIG. 7 is an operation explanatory view of the piston assembling apparatus A.

Insertion operations of the pistons 1 will be described below with reference to FIGS. 7 to 9. In this embodiment, the pistons 1 are inserted into the cylinder bores CB1 and CB3 first. For this purpose, as shown in FIG. 7, the piston holding unit 10 located at the retracted position and the pressing rods 21 located at the retracted positions are respectively moved to the first positions. The piston holding unit 10 is moved using the driving unit 35 of the moving device 30.

Figure 8:
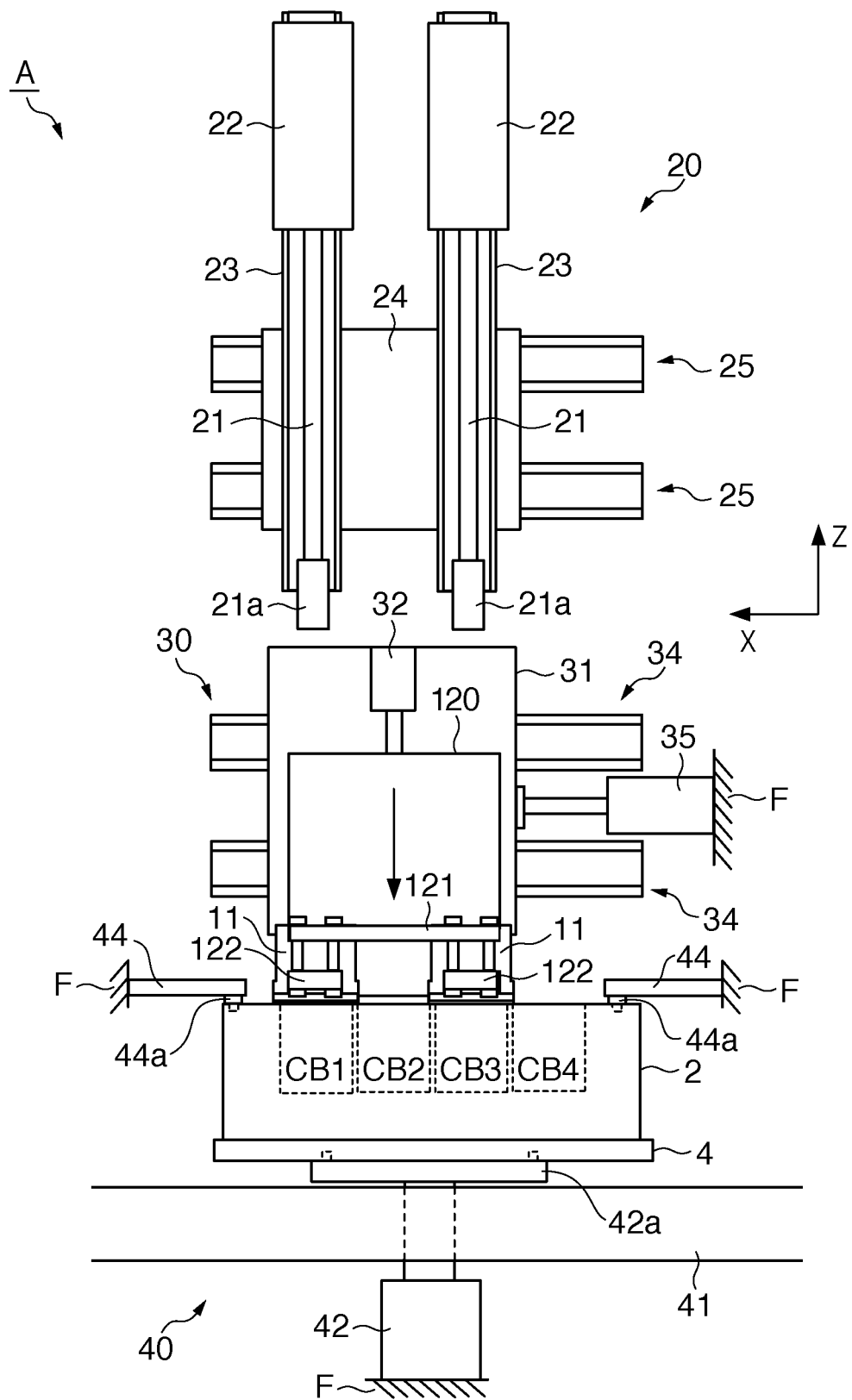
FIG. 8 is an operation explanatory view of the piston assembling apparatus A.

Subsequently, as shown in FIG. 8, the piston holding unit 10 located at the retracted position is moved downward by the driving unit 32 of the driving device 30 to be moved to the insertion preparation position. Thus, the lower ends of the guide tube portions 11 are brought into contact with the upper surface of the cylinder block 2. After this contact, the robot 5 inserts the pistons 1 into the guide tube portions 11 of the piston holding unit 10, so that the guide tube portions 11 contain the pistons 1.

Figure 11:
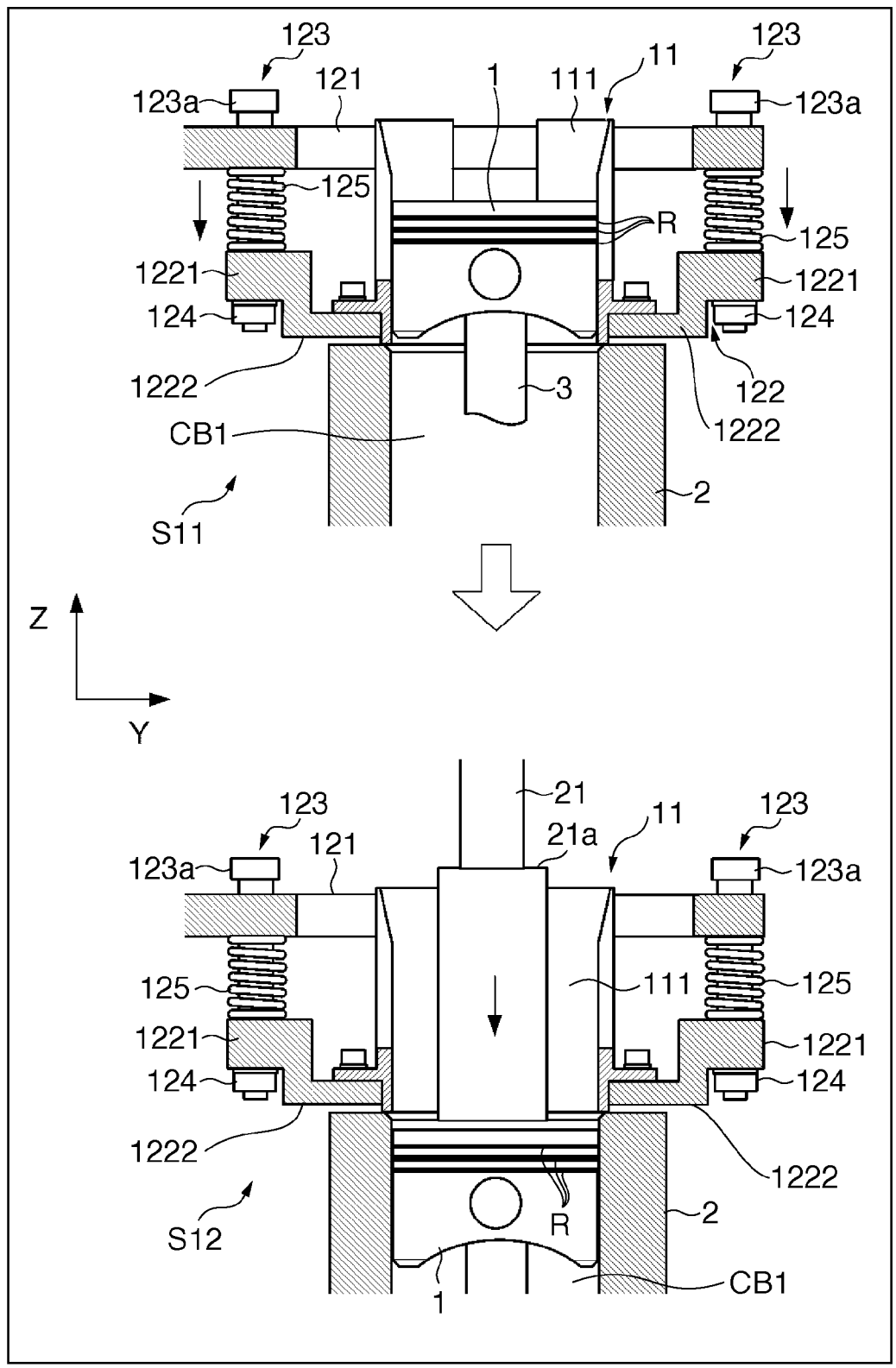
FIG. 11 is an operation explanatory view of the piston assembling apparatus A.

A state S11 shown in FIG. 11 shows a state around each guide tube portion 11 at this time. By elastic forces of the elastic members 125, the guide tube portion 11 is set in a state in which its lower end slightly presses and is brought into tight contact with the upper surface of the cylinder block 2. As described above, since the rod members 123 and upper portion member 121 are not fixed, the head portions 123a are slightly spaced apart from the upper surface of the upper portion member 121. Since the rod members 123 are displaceable in the Z direction with respect to the upper portion member 121, and the elastic members 125 are arranged, positioning in the Z direction required to locate the piston holding unit 10 at the insertion preparation position does not require any strict precision in an operation amount of the driving unit 32.

Figure 9:
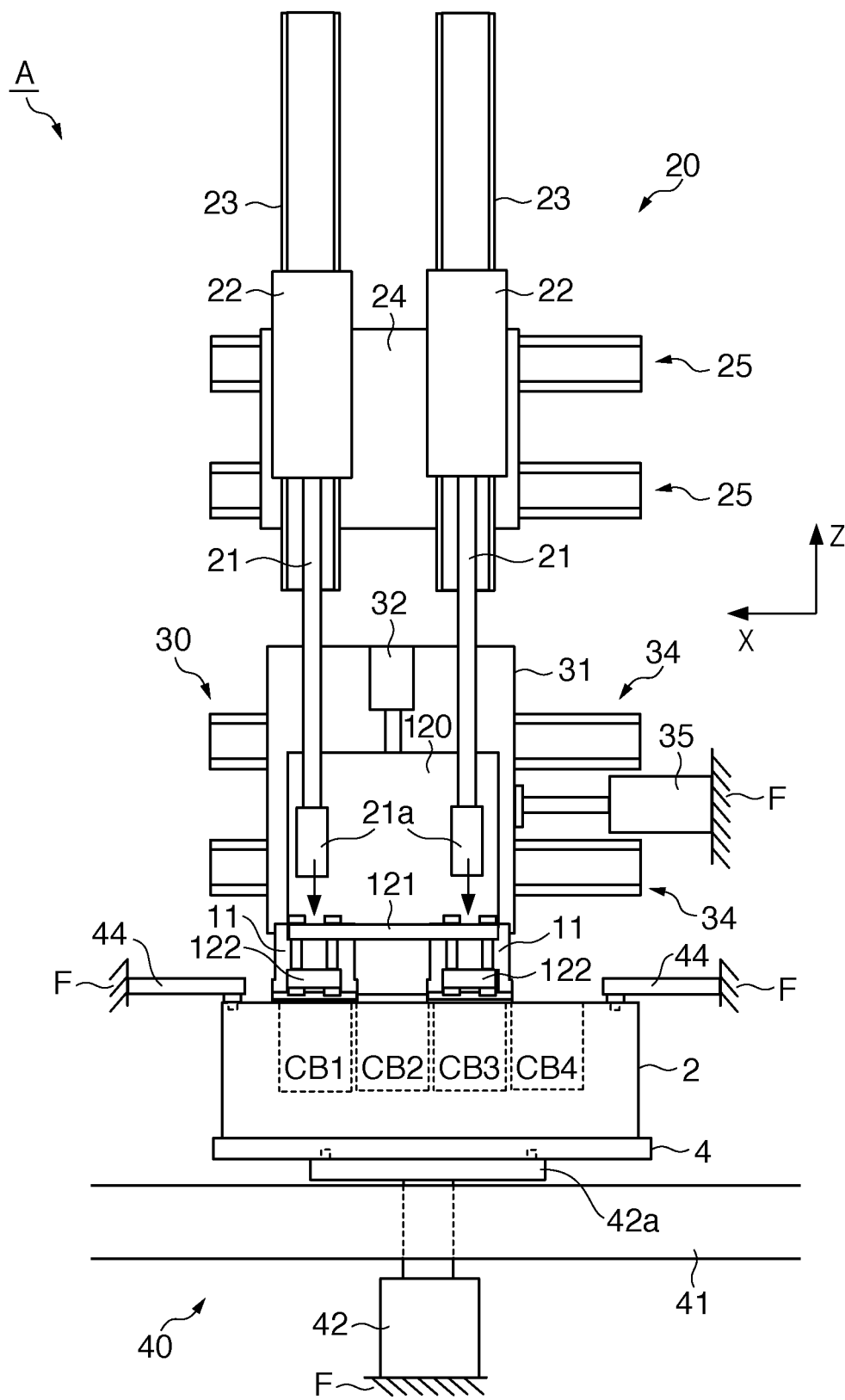
FIG. 9 is an operation explanatory view of the piston assembling apparatus A.

Subsequently, as shown in FIG. 9, the pressing rods 21 are moved downward from the retracted position to the insertion position. A state S12 shown in FIG. 11 indicates a state around each guide tube portion 11 at this time. Since the pressing portion 21a of the pressing rod 21 presses the piston 1 downward, the piston 1 is inserted into the cylinder bore (CB1 in FIG. 11). Thus, the insertion operations of the pistons 1 into the cylinder bores CB1 and CB3 are complete.

Figure 10:
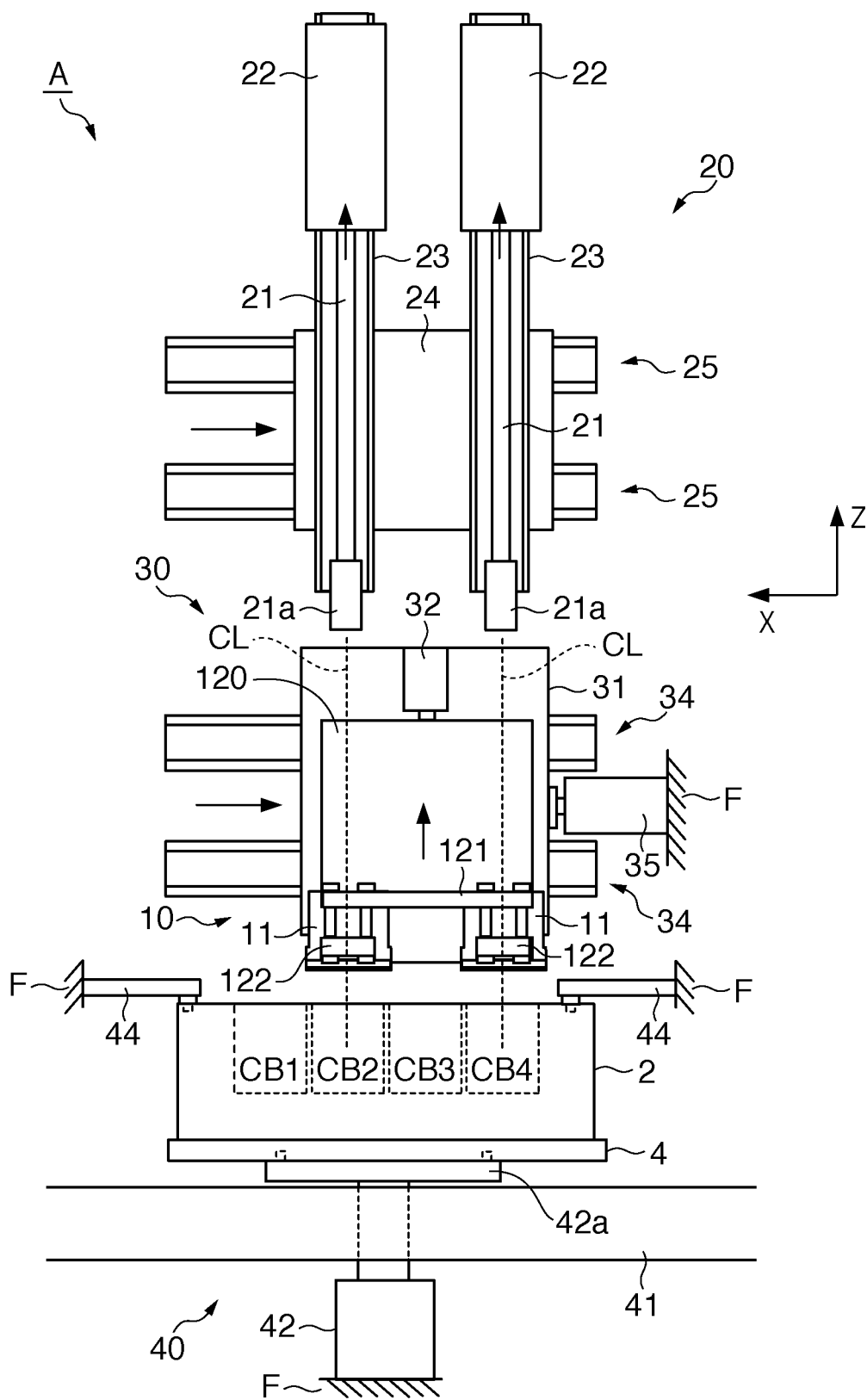
FIG. 10 is an operation explanatory view of the piston assembling apparatus A.

Subsequently, insertion operations of the pistons 1 into the cylinder bores CB2 and CB4 are started. Initially, the pressing rods 21 are returned to the retracted position, and the piston holding unit 10 is returned to the retracted position. Furthermore, the piston holding unit 10 and pressing rods 21 are respectively moved to the second positions (FIG. 10). After completion of movement, the piston holding unit 10 is moved downward, so that the lower ends of the guide tube portions 11 are brought into contact with the upper surface of the cylinder block 2. After that, the robot 5 controls the pistons 1 to be contained in the guide tube portions 11 of the piston holding unit 10. Then, the insertion operations are performed in the same manner as those of the pistons 1 into the cylinder bores CB1 and CB3, thus also completing the insertion operations of the pistons 1 into the cylinder bores CB2 and CB4.

Note that in this embodiment, upon switching the pair of cylinder bores CB1 and CB3 and that of cylinder bores CB2 and CB4, the pressing rods 21 and piston holding unit 10 are moved in the X direction. Alternatively, the cylinder block 2 may be moved in the X direction.

Also, upon insertion of the pistons 1 into the cylinder bores CB1 to CB4, it is preferable to minutely vibrate the pistons 1. By minutely vibrating the pistons 1, the pistons 1 can be inserted into the cylinder bores more stably. A vibrating device required to minutely vibrate the pistons 1 may be included in, for example, the pressing unit 20, so that vibrations generated by the vibrating device are transferred to the pistons 1 via the pressing rods 21. A frequency of minute vibrations is desirably low in terms of prevention of resonances between the cylinder block 2 and pistons 1, and is, for example, 130 Hz or lower.

<Automatic Alignment (Centering) Function>

Movement of the piston holding unit 10 to the insertion preparation position by the moving device 30 and that of the cylinder block 2 to the insertion preparation position by the moving device 40 correspond to movement control to the prescribed positions by means of coordinate management, and to tentative positioning. That is, the guide tube portions 11 and cylinder bore are not coaxial with each other in practice depending on the precision of the system, and position gaps may be generated. Also, position gaps may often be generated due to the precision of components and cluttering between components.

On the other hand, an upper end edge of each cylinder bore, and a lower end edge of a skirt portion of each piston are always chamfered. Thus, in this embodiment, each guide tube portion 11 is configured to be displaceable in its radial direction, and the guide tube portion 11 and cylinder bore are automatically aligned using these chamfered portions. This automatic alignment function will be described below with reference to FIGS. 12 to 14.

Figure 12:
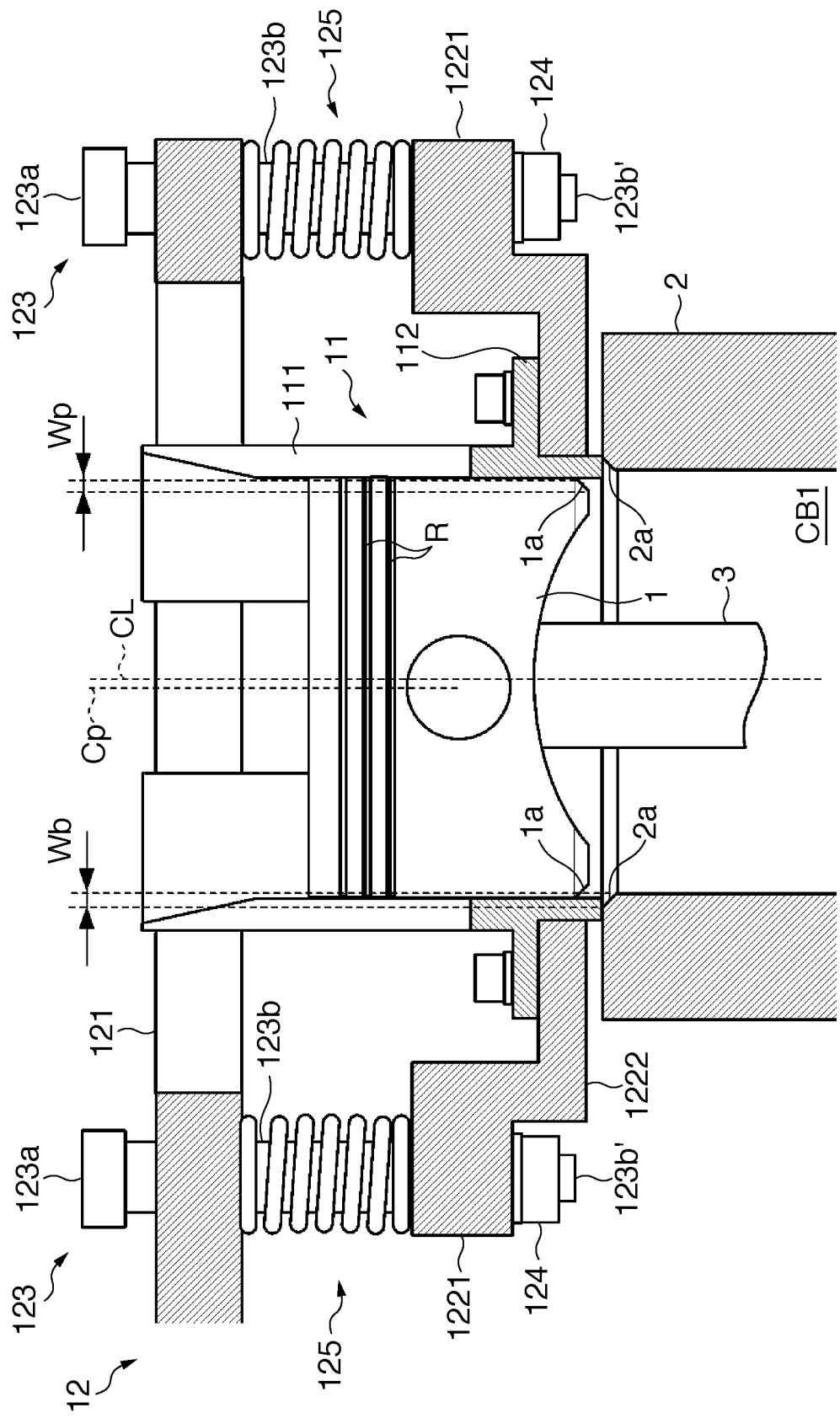
FIG. 12 is an explanatory view of an automatic alignment function.

FIG. 12 shows a state in which when the piston holding unit 10 and the cylinder block 2 are located at the insertion preparation position, a center (that of the piston 1) Cp of the guide tube portion 11 and a center CL of the cylinder bore CB1 are shifted from each other. The lower end edge of the skirt portion of the piston 1 is formed with a chambered portion 1a, and the upper end edge of the cylinder bore CB1 is formed with a chambered portion 2a. Note that respective figures exaggeratingly illustrate the chambered portions 1a and 2a for the sake of easy understanding. Actual widths Wp and Wb in a radial direction are, for example, about 0.2 to 0.3 mm or less although they depend on the precisions of the piston and cylinder bore.

Figure 13:
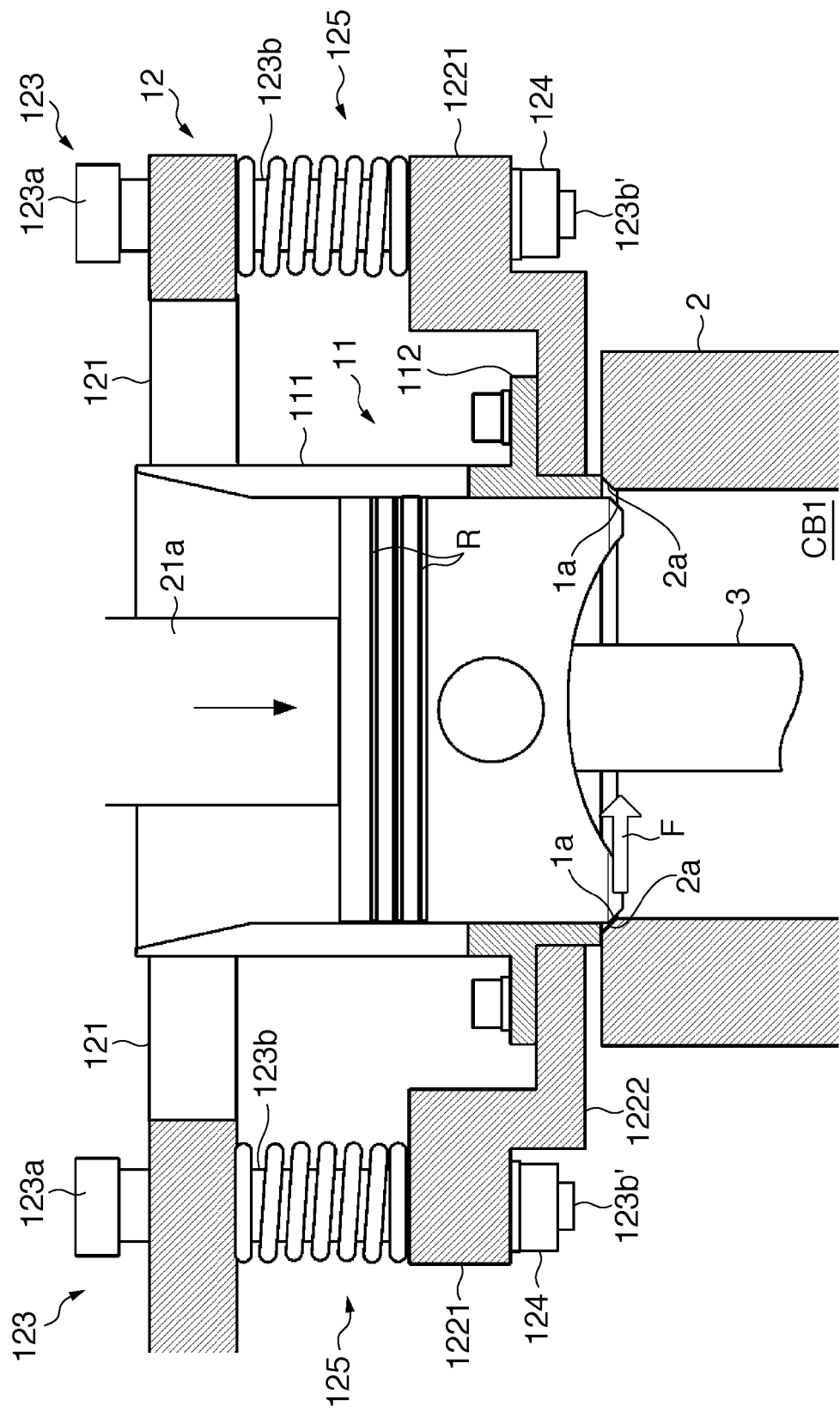
FIG. 13 is an explanatory view of the automatic alignment function.

In the state shown in FIG. 12, when the piston 1 is pushed down without any displacement in the horizontal direction, it cannot be inserted into the cylinder bore CB1. However, as described above, in this embodiment, the guide tube portion 11 is displaceable in its radial direction (horizontal direction) together with the lower portion member 122. As shown in FIG. 13, when the pressing portion 21a of the pressing rod 21 presses the piston 1, the chambered portions 1a and 2a are brought into contact with each other.

Figure 14:
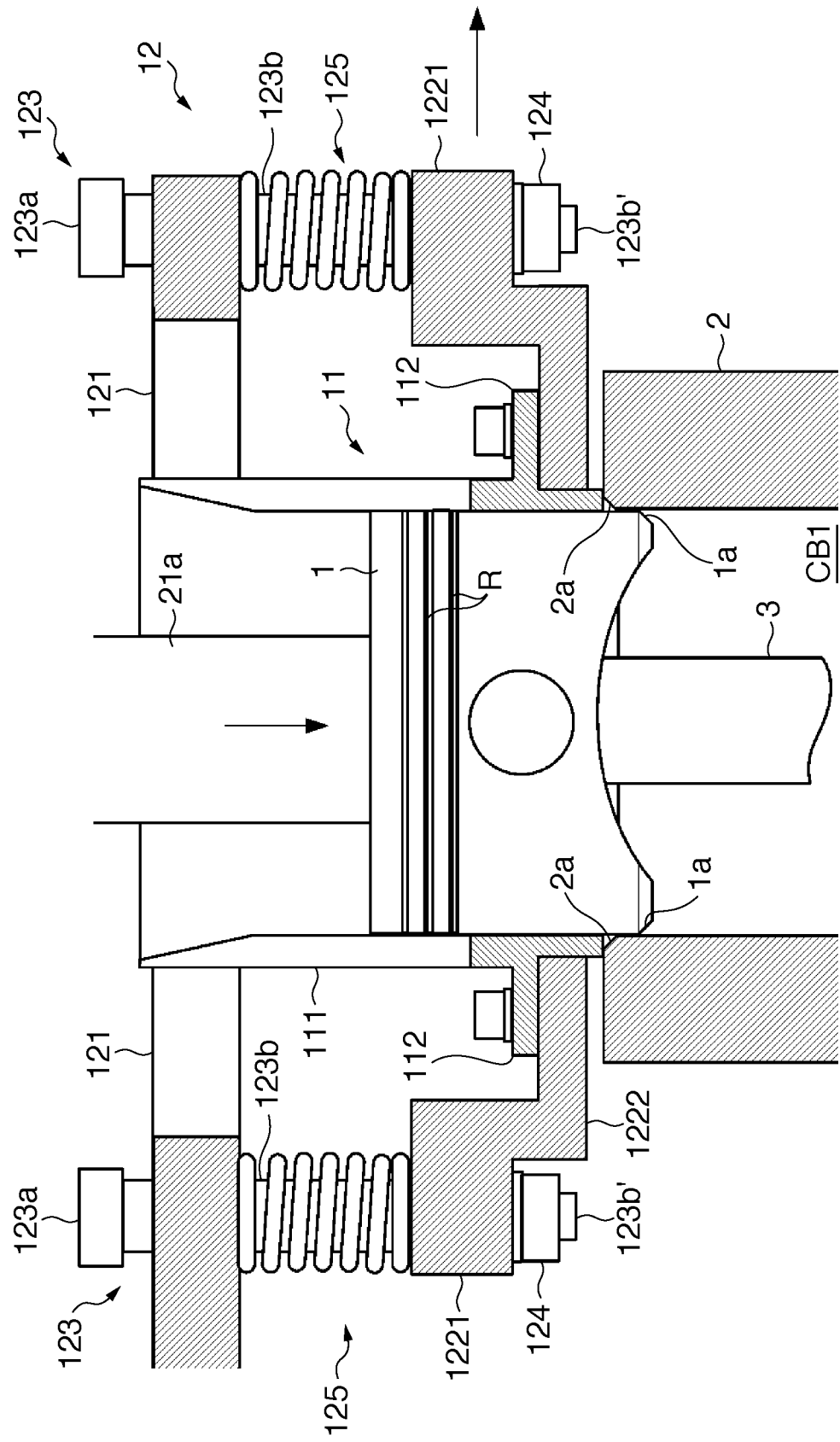
FIG. 14 is an explanatory view of the automatic alignment function.

After that, when the pressing portion 21a continues to press the piston 1, the chambered portion 1a slides along the chambered portion 2a. At this time, the piston 1 is slidably moved in a direction (that of an arrow F) to be coaxial with the cylinder bore CB1, and the guide tube portion 11 (and lower portion member 122) is also displaced in the direction to be coaxial with the cylinder bore CB1 to follow the slidable movement of the piston 1. That is, the piston 1 and guide tube portion 11 (and lower portion member 11) are integrally displaced to automatically align the center (that of the piston 1) Cp of the guide tube portion 11 and the center CL of the cylinder bore CB1 (FIG. 14). After this automatic alignment, the pressing portion 21a continues to press the piston 1 into the cylinder bore CB1 until the piston 1 is completely inserted into the cylinder bore CB1, thus completing the insertion operation.

As described above, in this embodiment, since the automatic alignment is executed using the chamfered portion of the upper end edge of the cylinder bore and that of the lower end edge of the skirt portion of the piston, no alignment operation between the guide tube portion 11 and cylinder bore after tentative positioning is required. Therefore, the piston insertion operation can be performed within a shorter period of time. In addition, the automatic alignment function can be realized by a simple arrangement in which the guide tube portion 11 is displaceable in its radial direction.

According to the method of this embodiment, the center (that of the piston 1) Cp of the guide tube portion 11 and the center CL of the cylinder bore can be automatically aligned within an overlapping range between the chambered portions 1a and 1b. Therefore, the tentative positioning suffices to have precision within the overlapping range between the chambered portions 1a and 2a. A shift amount W which can be automatically aligned is less than a sum of the widths Wp and Wb of the chambered portions 1a and 2a in the radial direction (W<Wp+Wb). Hence, a displaceable range L of the guide tube portion 11 suffices to meet L<Wp+Wb, and Dh−Dr<Wb+Wp in terms of the relation between the inner diameter Dh of the hole portion 121b and the outer diameter Dr of the shaft portion 123b. By setting the range L or the inner diameter Dh and outer diameter Dr, the guide tube portion 11 need not be displaced beyond the necessity.

The present invention is not limited to the above described embodiments, and various changes and variations are possible without deviating from the essence and the scope of the present invention. Accordingly, the following claims are attached in order to make public the scope of the present invention.

What is claimed is:

1. An assembling apparatus for inserting a piston into a cylinder bore formed in a cylinder block, comprising:

piston holding means comprising a guide tube portion which contains the piston and guides the piston into the cylinder bore, and a support portion which supports said guide tube portion to be displaceable in a radial direction thereof;

moving means for moving said piston holding means and the cylinder block so as to locate said piston holding means and the cylinder block at an insertion preparation position which is set in advance and which is where said guide tube portion and the cylinder bore are coaxial with each other; and pressing means for pressing the piston contained in said guide tube portion toward the cylinder block to insert the piston into the cylinder bore in a state in which said piston holding means and the cylinder block are located at the insertion preparation position, and said guide tube portion is supported by said support portion to be displaceable in the radial direction thereof, wherein said support portion comprises:
   an upper portion member; and
   a lower portion member which is supported to be displaceable against the upper portion member in the radial direction and to which said guide tube portion is fixed, and said assembling apparatus further comprises biasing members which are arranged between said upper portion member and said lower portion member so as to displace said lower portion member against said upper portion member in an inserting direction of the piston.

2. The assembling apparatus according to claim 1, wherein said guide tube portion is detachably fixed to said support portion.

3. The assembling apparatus according to claim 1, wherein said piston holding means comprises a plurality of said guide tube portions, and
   said pressing means comprises a pressing portion for pressing the piston for each of said guide tube portions.

4. An assembling apparatus for inserting a piston into a cylinder bore formed in a cylinder block, comprising:
 piston holding means comprising a guide tube portion which contains the piston and guides the piston into the cylinder bore, and a support portion which supports said guide tube portion to be displaceable in a radial direction thereof;
 moving means for moving said piston holding means and the cylinder block so as to locate said piston holding means and the cylinder block at an insertion preparation position which is set in advance and which is where said guide tube portion and the cylinder bore are coaxial with each other; and
 pressing means for pressing the piston contained in said guide tube portion toward the cylinder block to insert the piston into the cylinder bore in a state in which said piston holding means and the cylinder block are located at the insertion preparation position, and said guide tube portion is supported by said support portion to be displaceable in the radial direction thereof,
 wherein said guide tube portion is displaceable within a range of a length smaller than a sum of a width in a radial direction of a chamfered portion formed on an upper end edge of the cylinder bore and a width in a radial direction of a chambered portion formed on a lower end edge of a skirt portion of the piston.

5. The assembling apparatus according to claim 4, wherein said guide tube portion is detachably fixed to said support portion.

6. The assembling apparatus according to claim 4, wherein said piston holding means comprises a plurality of said guide tube portions, and
 said pressing means comprises a pressing portion for pressing the piston for each of said guide tube portions.

7. An assembling apparatus for inserting a piston into a cylinder bore formed in a cylinder block, comprising:
 piston holding means comprising a guide tube portion which contains the piston and guides the piston into the cylinder bore, and a support portion which supports said guide tube portion to be displaceable in a radial direction thereof;
 moving means for moving said piston holding means and the cylinder block so as to locate said piston holding means and the cylinder block at an insertion preparation position which is set in advance and which is where said guide tube portion and the cylinder bore are coaxial with each other; and
 pressing means for pressing the piston contained in said guide tube portion toward the cylinder block to insert the piston into the cylinder bore in a state in which said piston holding means and the cylinder block are located at the insertion preparation position, and said guide tube portion is supported by said support portion to be displaceable in the radial direction thereof,
 wherein said support portion comprises:
 an upper portion member; and
 a lower portion member which is suspended from said upper portion member via rod members and to which said guide tube portion is attached,
 at least one of said upper portion member and said lower portion member comprises hole portions through which the rod members are inserted and which have a diameter larger than the rod members, and
 said guide tube portion is displaceable in the radial direction within a range of a difference between diameters of the rod member and the hole portions.

8. The assembling apparatus according to claim 7, wherein at least one of said upper portion member and said lower portion member comprises tube members which form the hole portions.

9. The assembling apparatus according to claim 7, wherein elastic members for biasing said upper portion member and said lower portion member in a direction to be separated from each other are arranged between said upper portion member and said lower portion member.

10. The assembling apparatus according to claim 7, wherein said guide tube portion is detachably fixed to said support portion.

11. The assembling apparatus according to claim 7, wherein said piston holding means comprises a plurality of said guide tube portions, and
 said pressing means comprises a pressing portion for pressing the piston for each of said guide tube portions.

12. An assembling method of inserting a piston into a cylinder bore formed in a cylinder block, comprising:
 a containing step of containing the piston in a guide tube portion of piston holding means comprising the guide tube portion which contains the piston and guides the piston into the cylinder bore, and comprising a support portion which supports the guide tube portion to be displaceable in a radial direction thereof;
 a moving step of moving at least one of the piston holding means and the cylinder block so as to locate the piston holding means and the cylinder block at an insertion preparation position which is set in advance and which is where the guide tube portion and the cylinder bore are coaxial with each other; and
 a pressing step of pressing the piston contained in the guide tube portion toward the cylinder block to insert the piston into the cylinder bore in a state in which the piston holding means and the cylinder block are located at the insertion preparation position, and the guide tube portion is supported by the support portion to be displaceable in the radial direction thereof,
 wherein the pressing step further comprises:
 an alignment step of aligning a center of the piston with respect to a center of the cylinder bore since a chamfered portion formed at a lower end edge of a skirt portion of the piston slides along a chamfered portion formed at an upper end edge of the cylinder bore upon pressing of the piston when the piston holding means and the cylinder block are located at the insertion preparation position, and the center of the piston is shifted from the center of the cylinder bore.

13. The assembling method according to claim 12, wherein the pressing step further comprises:
 a pushing step of pushing the piston aligned in the alignment step into the cylinder bore.

* * * * *